Aug. 25, 1931.         B. H. ZEIBIG              1,820,369
                  ELECTRIC GASOLINE GAUGE
                   Filed Jan. 30, 1929
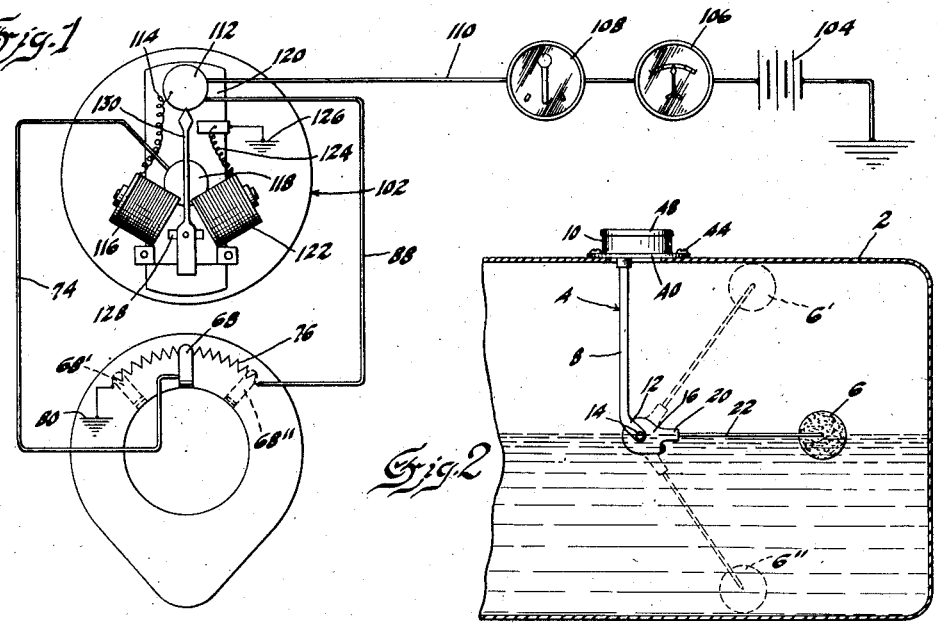
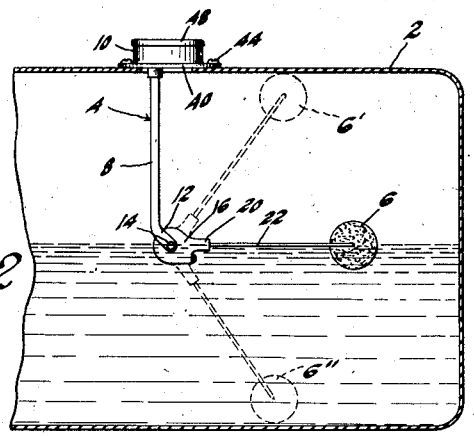
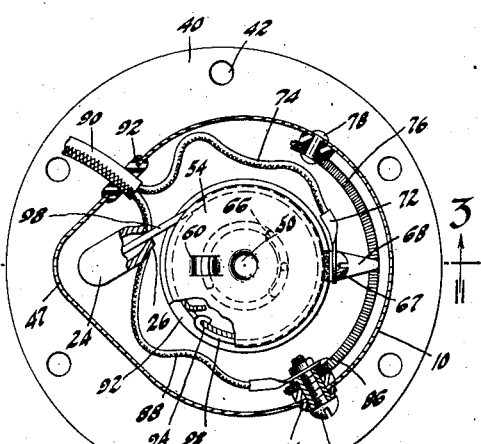
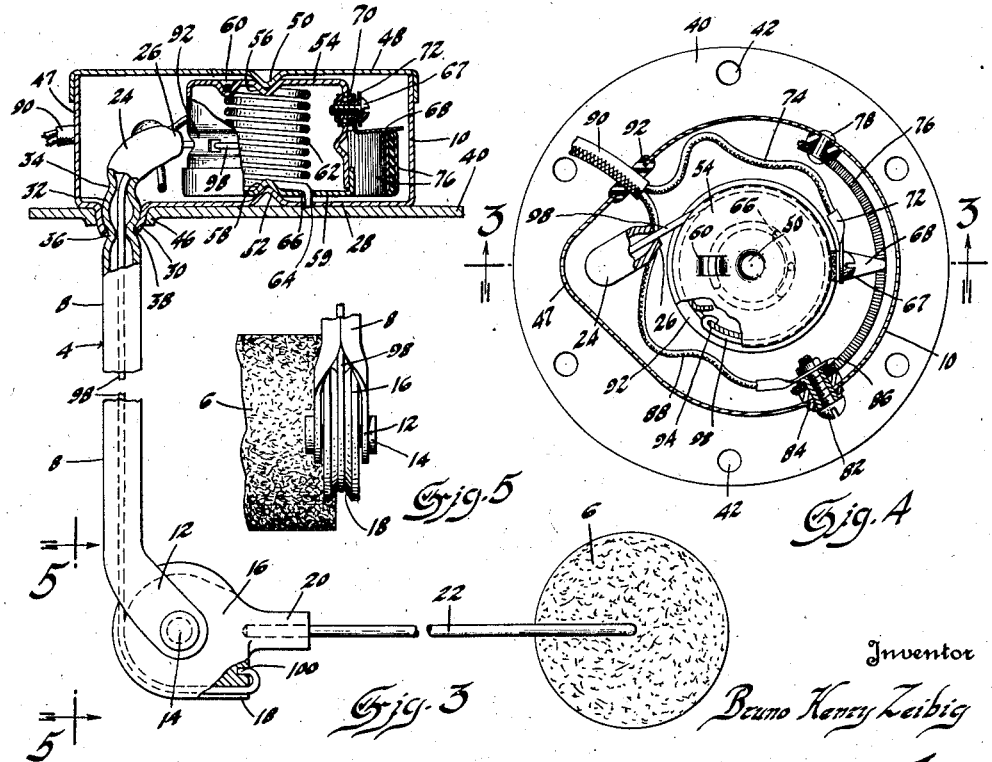
Inventor
Bruno Henry Zeibig
By Blackmore, Spencer & Flint
Attorneys Patented Aug. 25, 1931

1,820,369

UNITED STATES PATENT OFFICE

BRUNO HENRY ZEIBIG, OF FLINT, MICHIGAN, ASSIGNOR TO A C SPARK PLUG COMPANY, OF FLINT, MICHIGAN, A COMPANY OF MICHIGAN

ELECTRIC GASOLINE GAUGE

Application filed January 30, 1929. Serial No. 336,082.

This invention relates to liquid level gauges and it has particular reference to liquid level gauges applied to the gasoline tank of automotive vehicles although it is adaptable to liquid containing receptacles of all kinds.

The gauge is of the type which uses a float in the liquid receptacle to operate a movable electric contact over a resistance on the tank. The position of the contact determines the flow of electrical current through the coils of a gauge located at the vehicle instrument board and the reading on the gauge therefore indicates the level of the liquid in the gasoline tank.

The invention relates particularly to improvements in the unit or mechanism at the gasoline tank for operating the movable contact. This mechanism is preferably constructed as a unit so that it may be applied directly to the tank. The improvements are concerned with the use of a drum pivoted in a housing adapted to be mounted on the gasoline tank. A tube or pipe acting as a support is secured in a wall of the housing and extends down into the gasoline tank. A wire extends through the tube and has one end attached to the drum, its opposite end being attached to a member pivoted to the tube end and to which member a float is secured. The tube is provided at the housing end with a plurality of restrictions or crimped portions which serve as bearings for the wire as well as to prevent the passage of gasoline fumes or vapor from the fuel tank into the housing. A coil spring positioned on the interior of the drum has one end fixed to the wall of the drum and its opposite end extending through a slot in the drum and secured to a housing. The spring always tends to urge the drum to one of its extreme positions corresponding to the lowermost position of the float. A contact rigidly attached to the drum moves therewith over an arcuate resistance positioned in the housing. The drum is pivoted in the housing by means of the interfitting indentations or projections pressed inwardly from both housing and drum.

On the drawings:

Figure 1 is a diagram of the electrical connections disclosing the operation of the device.

Figure 2 is a view of the tank unit applied to the gasoline tank of an automotive vehicle.

Figure 3 is an enlarged view of the tank unit with parts shown in section for purposes of clearer illustration, the upper sectioned parts being taken substantially on the line 3—3 of Figure 4.

Figure 4 is a plan view of the structure shown in Figure 3 with the cover removed.

Figure 5 is a detail view taken on the line 5—5 of Figure 3.

Referring to the drawings the numeral 2 indicates a receptacle or tank of any suitable type, in the present invention illustrated as the gasoline tank of an automotive vehicle. A tank unit of the present invention is indicated as a whole at 4 and comprises the float 6, the tube or support 8, and the upper housing portion 10.

The lower end of the tube 8, (which may be formed of a single sheet of metal rolled to tubular form) is forked as indicated at 12. Between the tines of the fork 12 there is pivoted as at 14 the wheel like member 16 having the peripheral groove 18. The member 16 has the extension 20 provided with an opening in which there is secured the end of a suitable rod 22 which secures the float 6 to the member 16.

At its upper portion the tube 8 extends within the housing 10, is bent laterally as shown at 24, and has its end portion crimped or restricted as shown at 26. The bottom 28 of the housing 10 has an outwardly or downwardly flanged annular portion 30 in which there is received the portion 32 of the tube between the restrictions or crimped portions 34 and 36. The end of the annular flange 30 extends into the lower crimped portion 36 as indicated at 38 and rigidly holds the tube onto the housing. The housing 10 is secured to the plate 40 provided with suitable openings 42 for the reception of the screw bolts 44 by means of which the unit 4 is secured to the tank 2. The plate 40 has the annular outwardly extending flange 46 conforming to the flange 30 of the bottom 28 of the housing 10. The housing 10 is generally circular but has an extension or oblong formation as shown at 47 at one portion thereof.

The housing 10 is provided with the cover 48 and in the cover 48 as well as the housing bottom 28 there are provided the inwardly projecting portions or indentations 50 and 52. A drum or mounting 54 is positioned within the housing and is provided with indentations or projections 56 and 58 which conform with the projections 50 and 52 to form a pivotal connection for the drum.

The base of the drum is provided with an inwardly bent portion or tongue 60 in which there is received one end of a coil spring 62. The opposite end 64 of the spring projects through a slot 66 in the cover 59 and is secured to the bottom 28 of the housing 10. The purpose of this spring is to urge the drum to one of its extreme positions permitted by the movement of the float 6. In other words, the spring 62 will urge the drum to the position corresponding to the lowermost position of the float 6, indicated at 6'' in Figure 2.

Secured to the drum 54 by means of the screw 67 is a contact finger 68. The screw 67 also secures to the contact finger the insulating material 70 (which insulates the finger from the drum) and the end 72 of a wire or lead 74 which runs to the gauge.

The contact 68 operates over a resistance coil 76 secured to the housing 10 at one end by means of a rivet 78 which also forms a ground connection as indicated at 80. The opposite end of the resistance 76 is connected to the housing by means of screw 82 and is insulated therefrom by the insulating material 84. Secured to the screw is the terminal 86 of a wire 88 which wire leads to the gauge at the instrument board of the vehicle. The two wires 74 and 88 are enclosed in a suitable insulating covering 90 which passes from the housing through the insulating grommet or bushing 92.

The drum 54 has a groove 92 in its periphery and secured in this groove as at 94 is one end of a flexible wire 98, preferably piano wire. The wire is wound about the groove in the drum one or more times as desired and passes through the restrictions 26, 34, and 36 in the tube, downwardly through the lower end of the tube and about the groove 18 in the member 16 and is secured at its opposite end 100 by bending the wire into an opening in the wheel member 16.

From the description of the parts above described it will be apparent that as the float 6 (when considering the structure of Fig. 3) rises, it will communicate its movement by means of the wire 98 to the drum 54 which in turn will move the contact 68 rigid therewith over the surface of the resistance 76 to move the contact toward the end of the resistance at the rivet 78. The spring 62 moves the drum and contact in the reverse direction or toward the end at the screw 82.

Referring to Fig. 1, there is shown the electric circuit for operating the gauge 102 which is preferably mounted at the instrument board of an automotive vehicle.

The numeral 104 indicates a source of electric current, 106 an ammeter, 108 a switch and 110 the wire or connection leading from the battery to the terminal indicated at 112. The position of the parts in Fig. 1 is that corresponding to the full line float position in Figs. 2 and 3. As the current comes from the battery to the terminal 112, it will tend to divide, one portion going through the lead 114 to the coil 116, the other portion through the wire 88 to the resistance 76. In the position of the contact finger 68 on the resistance 76 as shown, the current will follow the path of least resistance and flow through the connection 114 into the coil 116 to the contact 118 into the frame 120 through the coil 122, connection 124 to ground as at 126. The balanced resistance set up by the resistance coil when the contact finger is in mid-position will give substantially equal strength to the two coils 116, 122 which will cause the armature 128 to assume the position shown in Fig. 1 and will bring the pointer 130 to be at the mid point of the scale, or indicate that the tank is half full.

If additional liquid is now added to the tank the float 6 will rise to the position indicated at 6' in Fig. 2 which will cause the drum 54 to swing in a counterclockwise position and shift the contact finger 68 to the position 68' of Fig. 1. When the current now reaches the terminal 112 it will substantially all flow through the connection 114, coil 116, terminal 118, wire 74 to ground at 80, causing the coil 116 to be energized to substantially its full strength and bring about substantially the weakest energization of the coil 122. This will bring the armature 128 into parallelism to the center line of the coil 116 and swing the pointer 130 to its extreme position to the right and indicate tank full position.

When the tank is empty or in float position 6'' the coil spring 62 will rotate the drum 54 in a clockwise direction and move the contact finger 68 to the position 68'' shown in Fig. 1. The current when it now reaches the terminal 112 will follow along the lines of least resistance and flow through the connection 88 through contact finger 68, wire 74 to terminal 118 from where it will flow through coil 122 to give it its maximum energization. The amount of current flowing through connection 114 and coil 116 will be a minimum and will therefore give to the coil 116 its smallest degree of energization. The armature 128 will now swing in alignment with the center of the coil 122 and swing the pointer to its extreme left hand position to indicate tank empty position.

I claim:

1. In a device for determining the level of a liquid in a receptacle, a housing mounted on the receptacle, a contact, a mounting for the contact in said housing, indented portions on the housing and mounting forming a pivotal connection, a flexible member attached to the mounting, and means responsive to changes in level of the liquid in the receptacle for pulling the flexible member to move the contact.

2. In a device for determining the level of a liquid in a receptacle, a housing secured to the receptacle, a movable contact in the housing, a tube secured to the housing and extending into the receptacle, a float pivotally connected to the tube, a flexible member operatively connected to the contact and float and passing through the tube, and a restricted portion in said tube to serve as a bearing for said flexible member and to restrict the passage of fumes from said receptacle to said housing.

3. In a device for determining the level of a liquid in a receptacle, a housing secured to the receptacle, a tube rigidly mounted in the housing and extending both inside the housing and inside the receptacle, a contact movably mounted in the housing, a flexible member attached to the contact mounting and extending through the tube, a plurality of restricted portions in said tube serving as bearings for the flexible member and to restrict the passage of fumes from the receptacle to the housing, a float pivotally mounted within the receptacle on said tube, and means operably connecting said flexible member to said float to cause said contact to move in response to changes in level of the liquid.

In testimony whereof I affix my signature.

B. H. ZEIBIG.